Oct. 14, 1969

P. P. WUESTHOFF 3,472,342

SAFETY HOIST IN A MANIPULATOR AND METHOD OF COUNTERBALANCING

Filed Oct. 2, 1967

Inventor
PAUL P. WUESTHOFF
By Cohn and Powell
Attorneys

Oct. 14, 1969     P. P. WUESTHOFF     3,472,342

SAFETY HOIST IN A MANIPULATOR AND METHOD OF COUNTERBALANCING

Filed Oct. 5, 1967     2 Sheets-Sheet 2

Inventor
PAUL P. WUESTHOFF
By Cohn and Powell
Attorneys

United States Patent Office 3,472,342
Patented Oct. 14, 1969

3,472,342
SAFETY HOIST IN A MANIPULATOR AND METHOD OF COUNTERBALANCING
Paul P. Wuesthoff, St. Louis, Mo., assignor to The Pandjiris Weldment Co., St. Louis, Mo., a corporation of Missouri
Filed Oct. 5, 1967, Ser. No. 673,157
Int. Cl. B66b 11/04, 5/00
U.S. Cl. 187—20     8 Claims

ABSTRACT OF THE DISCLOSURE

A safety hoist in a manipulator that includes a boom reciprocatively mounted on a vertical column by a saddle plate, and a variable weight means such as a man and welding wire pack selectily carried by the boom. The boom, saddle plate and other parts and equipment typically carried thereon, constitute a positioning means. A cable interconnects the saddle plate with a counterbalance, the cable passing over a sheave rotatively mounted on the column. Integral bearing journals of the sheave have at least a diameter that affords a predetermined rotational frictional resistance with their cooperating bearings under load so that the cable has a continuous resistance to at least compensate for any weight imbalance between the positioning means and the counterbalance, including any weight imbalance caused by the variable weight means. The method of counterbalancing includes the step of making the integral bearing journals of the sheave of at least a diameter to provide this compensatory, continuous resistance in the cable.

Background of the invention

This invention relates generally to a safety hoist in a manipulator that is especially adapted for use in welding operations, and more particularly to an improved hoist that compensates for load changes of a type that cannot be cared for by usual counterbalancing assemblies. The invention relates also to the method of counterbalancing to compensate for such load changes.

The manipulator includes a boom reciprocatively mounted on a vertical column by a saddle plate. An operator can selectively sit on the boom. The operator, whether sitting on the boom or not, can move the boom vertically on the column or horizontally on the saddle plate for selectively positioning welding equipment during welding operation. Under some circumstances, a welding wire pack is selectively carried by the boom. The operator, wire pack and other optional equipment carried by the boom constitute a variable weight that can range between wide limits. For example, the weight of the wire pack diminishes as the wire is used. The heretofore conventional manipulators of this type did not provide a reliable counterbalance for any variable weight.

Moreover, the prior manipulators were constructed in a manner such that failure of any one of numerous parts could cause the boom to fall. Because a man is usually seated on the boom end, this kind of accident is very serious and hazardous. For example, a hoisting chain could fail without any warning. When one chain link fails, the entire chain is out of service immediately. The chances are, if one chain breaks, other supporting chains will break also when the load shifts over to such chains. The same hazardous condition exists when the saddle plate is mounted and movable on vertical racks, particularly if there is no counterbalance at all. A rack is engaged by a pinion usually mounted on a cantilevered shaft. If the shaft breaks because of a flaw, or because of an overload, the entire weight shifts over to another rack and pinion drive, and again, only one element has to fail in order to produce a potentially serious accident. Other assemblies rely on some brake or drive connection such as a self-locking worm gear reducer, to preclude unintentional rotation of the hoisting sprocket. These mechanisms can fail. Further, the various so-called "safety devices" carried by the saddle plate or boom which supposedly work when the boom starts to fall, have not proved satisfactory for many reasons, i.e., parts have broken, frozen in position or otherwise operated unreliably.

Summary of the invention

In the present safety hoist, the bearing journals of the hoisting wheel are unusually large and are formed integrally with the wheel, the journals being supported in coacting bearings with the necessary tolerance to rotate freely under no load. Ordinarily, hoisting sheaves are supported on shafts with journals for bearings just large enough to provide the necessary strength to support the load and keep the resistance caused by friction generated in the bearings, to a minimum. The large journals of the present assembly are for the purpose of providing a continuous predetermined resistance against rotation of the hoisting wheel under load conditions. This "built-in" resistance is to compensate for the changes in load on the boom which cannot be cared for by counterbalancing.

This safety hoist utilizes the shaft supporting the hoisting wheel and the bearings, which are indispensible parts of any hoist, not only to support, but to generate resistance against rotation under load by virtue of the relatively large diameter journals to compensate for discrepancies in counterbalancing. Thus, a so-called safety brake is built in the journals and bearings.

The effective resistance necessary to provide absolute safety for the operator who has to ride the boom of the manipulator, is based on the bearings and journals operating with maximum lubrication. If for some reason the lubrication of the bearings is neglected, it could only make the manipulator a safer device to use. It is possible that the lack of lubrication could stall the drive motor, which would then be a warning to the operator that the hoist needs attention.

The safety hoist includes a flexible member such as a cable interconnecting the positioning means and the conterbalance means, the flexible member passing over and operatively engaging the hoisting wheel such as a sheave. The integral journals of the hoisting wheel have at least a diameter that affords a rotational frictional resistance with the cooperating bearing means so that the flexible member has a continuous resistance to at least compensate for any weight imbalance between the positioning means and the counterbalance means, including a weight imbalance caused by the variable weight means.

The bearing journals have at least a diameter to compensate for the largest weight imbalance between the positioning means and the counterbalance means as caused by the variable weight means.

Preferably, the weight of the counterbalance means is between the weight of the positioning means and the weight of the positioning means plus the maximum weight of the variable weight means. In such event, the bearing journals of the hoisting wheel have at least a diameter to compensate for the maximum amount of weight imbalance. Ideally, the weight of the counterbalance means is equal to the weight of the positioning means plus one-half of the weight range of the variable weight means, and the bearing journals have at least a diameter to compensate for one-half the variable weight range.

For safety, the diameter of the bearing journals of the hoisting wheel is at least as large as the greater diameter expressed by the equations:

$$D_1 = \frac{(W_1 - W_2)}{(uW_1 + uW_2)} D_2$$

and $$D_1 = \frac{W_2 - (W_1 - W_3)}{uW_2 + u(W_1 - W_3)} D_2$$

wherein:

$D_1$ is the diameter of the bearing journals,
$D_2$ is the effective diameter of the hoisting wheel,
$W_1$ is the maximum weight of the positioning means, and variable weight means,
$W_2$ is the weight of the counterbalance means, and
$W_3$ is the maximum variable weight means, and
$u$ is the coefficient of friction.

Stated differently, the ratio of the bearing journals' diameter to the hoisting wheel's effective diameter is at least the larger of the ratio of the maximum amount of weight imbalance between the counterbalance means and the positioning means plus the variable weight means to the sum of the maximum weight of the counterbalance means and the positioning means plus the variable weight means multiplied by the coefficient of friction; or of the ratio of the maximum amount of weight imbalance between the counterbalance means and the positioning means to the sum of the weights of the counterbalance means and positioning means multiplied by the coefficient of friction. In other words, the ratio of the diameters should be at least equal to the maximum ratio of the load imbalance to the sum of the loads producing the imbalance multiplied by the coefficient of friction.

Two flexible members interconnect the positioning means and the counterbalance means, one flexible member being under tension and supporting the load, and the other flexible member being tight but free of load-supporting tension, yet capable of supporting such load if the load is shifted to the said other flexible member.

The method of counterbalancing comprises the step of making the bearing journals of the hoisting wheel at least of a diameter to provide a predetermined rotational frictional resistance with the coacting bearing means so that the flexible member has a continuous resistance to at least compensate for any weight imbalance between the positioning means and the counterbalance means, including any weight imbalance caused by the variable weight means.

The hoist can be made at low cost, and is simple to install. The drive shaft of the motor speed reducer is pushed into and keyed to the hoisting wheel. No coupling is used. This drive cannot get out of line.

Only a small percent, say 5%, of all the manipulators utilize wire packs. These wire packs will vary in maximum loads in a wide load range, say 250 lbs. to 1,000 lbs. Only one hoist with bearing journals of at least a diameter to take care of the largest load of the positioning means and variable weight means (boom leads) need be built. The single design will take care of practically all the units for a particular classification of manipulator.

Description of the preferred embodiment

Figures 1, 2:
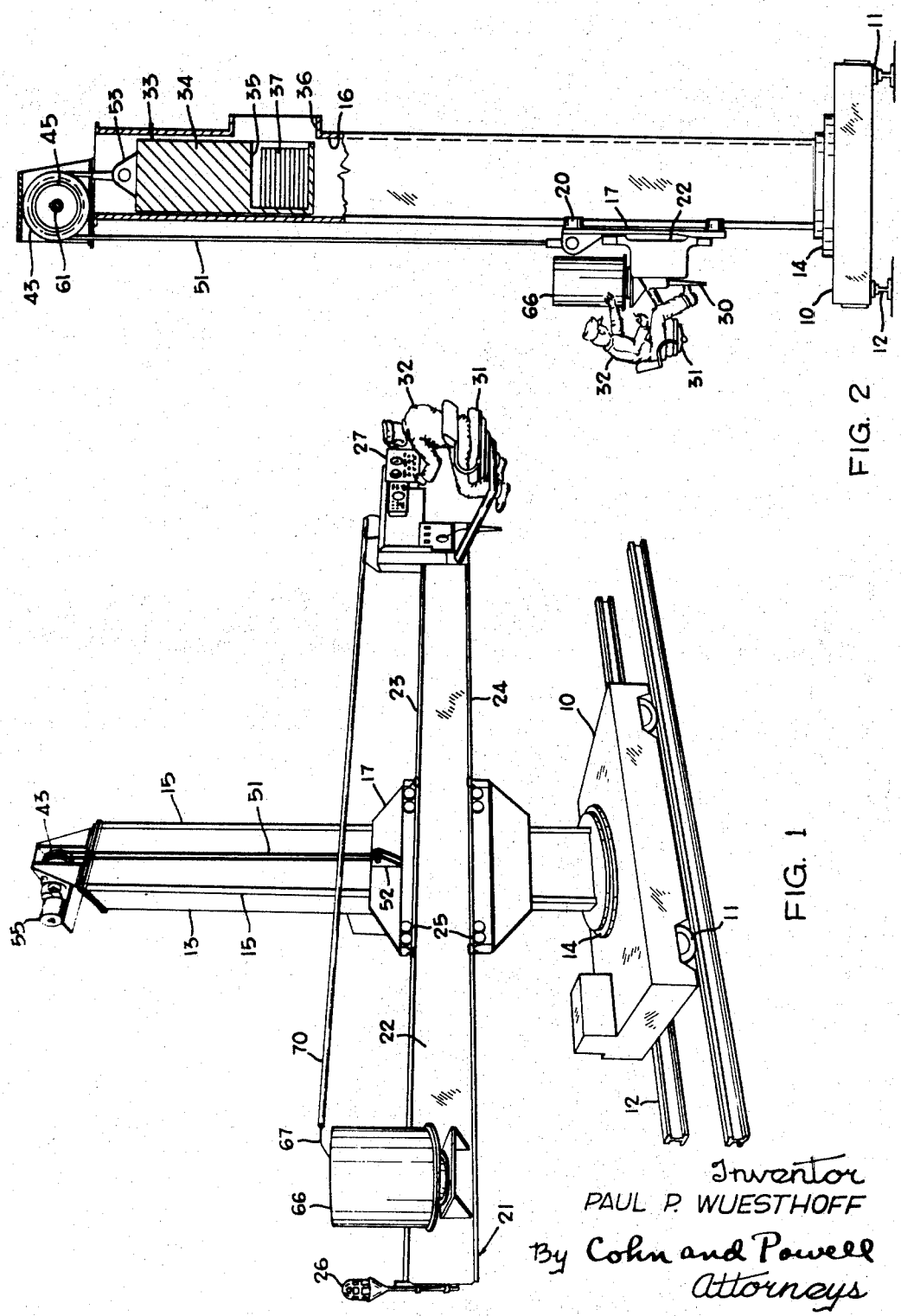
FIG. 1 is a front perspective view of the manipulator.
FIG. 2 is an end elevational view, partially in cross-sections.

Referring now by characters of reference to the drawings, and first to FIG. 1, the manipulator includes a base 10 mounted by wheels 11 on a pair of tracks 12. Of course, the base 10 could be mounted by suitable wheels on a subjacent floor or the base 10 could be stationary.

A substantially vertical column 13 is carried by the base 10, the column 13 being preferably mounted by a swivel connection 14 that enables the column 13 to rotate about a substantially vertical axis. For reasons which will later appear, the column 13 is provided with a pair of opposed, vertical tracks 15 at opposite sides of the front plate of column 13. From FIG. 2, it will appear that the column 13 is hollow to provide a vertical guideway 16.

Reciprocatively mounted on the vertical column 13, is a saddle plate 17. As is conventional, the saddle plate 17 incorporates rollers 20 at each side, adapted to engage the cooperating tracks 15 on column 13.

A boom unit generally indicated by 21 is mounted on and carried by saddle plate 17. This boom unit 21 includes a substantially horizontal boom 22 including upper and lower longitudinal tracks 23 and 24 respectively. Rollers 25 mounted on and carried by saddle plate 17 engage each of the tracks 23 and 24. Either end of boom 22 can be extended or retracted relative to the respective sides of column 13.

The boom 22 is adapted to carry any of the conventional, optional equipment. For example, a warning light 26 is fixed to one boom end. At the other boom end, suitable welding equipment 27 is mounted. This welding equipment 27 includes a welding head 30, best shown in FIG. 2. A seat 31 is fixed to and carried by the boom 22 adjacent to the welding equipment 27 that includes the welding controls for the welding head 30 and for operation of saddle plate 17 and boom 22. An operator indicated by 32 can sit in the seat 31 during welding operation. Of course, it will be understood, that the operator 32 need not sit in seat 31 and be carried by the boom 22, but rather can operate all manipulator and welding controls remotely.

In this type of manipulator, the boom 22 can be selectively extended or retracted by a suitable power mechanism operatively interconnecting the saddle plate 17 and boom 22. This power mechanism (not shown) usually includes an electric motor fixed to the saddle plate 17 which operates through a speed reducer to drive a pinion that meshes with an elongate rack fixed to the boom 22.

For the purpose of this description and explanation, the saddle plate 17 and the boom unit 21 including all equipment of fixed, known weight constitutes a positioning means. The weight of the positioning means does not include the operator 32 because the operator 32 may or may not utilize the boom seat 31.

Reciprocatively mounted in the column guideway 16, is a counterbalance means referred to by 33. The counterbalance means 33 includes an elongate weight 34 having a cross-section approximately, yet less than, the internal dimension of hollow column 13. Formed in the elongate weight 34 is a compartment 35 having an opening at the rear. Access to the compartment 35 is attained through a column opening 36 formed in the rear wall of column 13. Selectively disposed in the compartment 35 of weight 34 are a plurality of individual weights 37.

Figure 3:
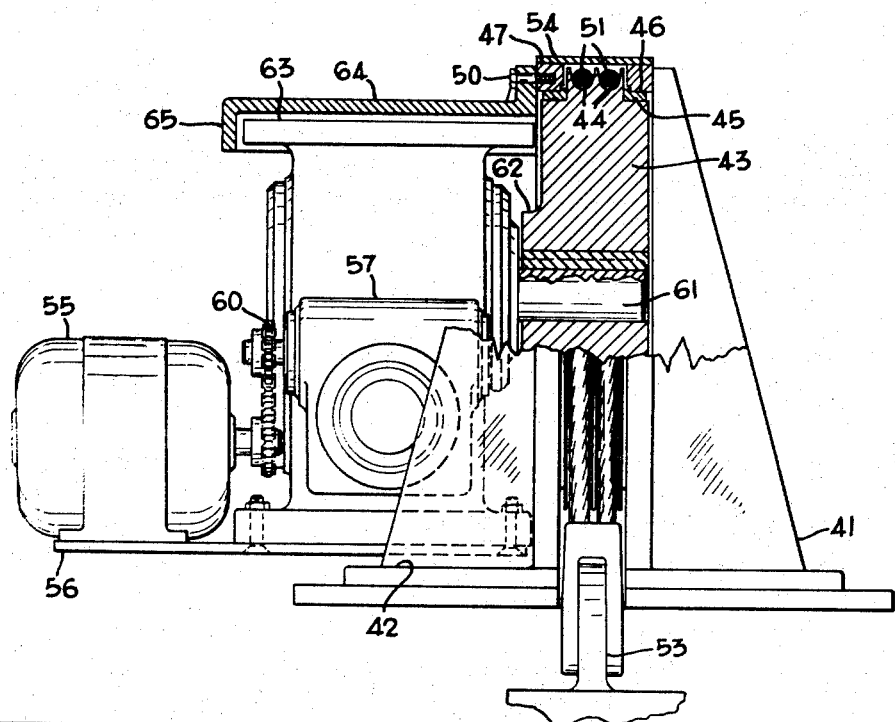
FIG. 3 is an enlarged front elevational view, partially in cross section, of the safety hoist.
Figure 4:
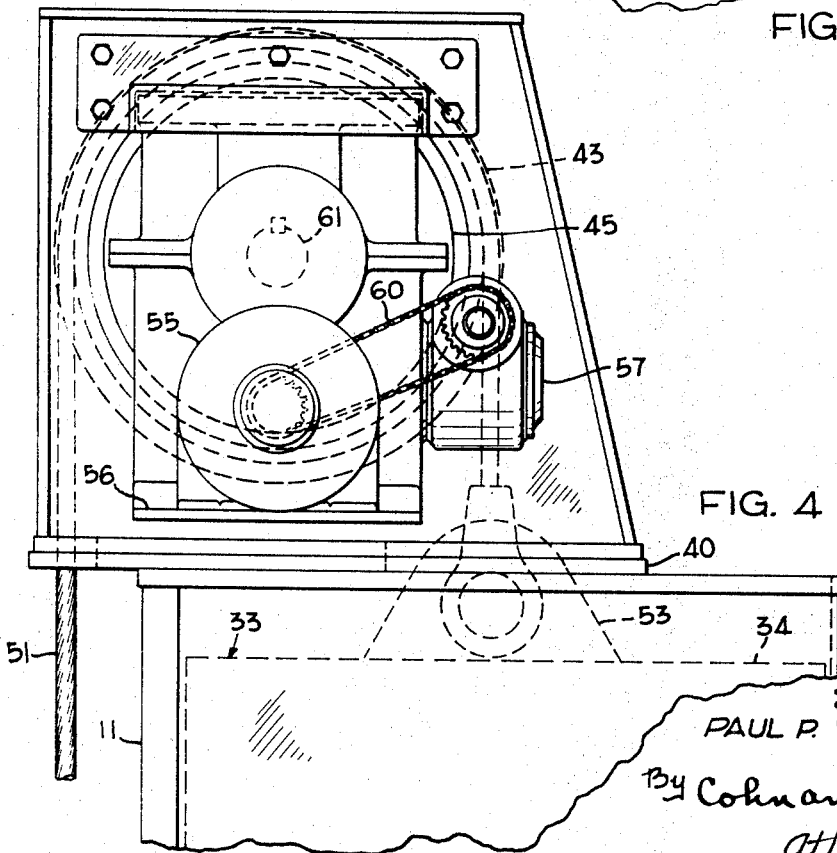
FIG. 4 is a side elevational view thereof.

The detailed construction of the safety hoist is best shown in FIGS. 3 and 4. The hoist assembly includes a platform 40 fixed to the top of column 13. Attached to the platform 40 are a pair of frame sections 41 and 42, the frame sections 41 and 42 being maintained in laterally spaced relation.

Located between and mounted on the frame sections 41 and 42, is a sheave 43, constituting a hoisting wheel, the sheave 43 including a double groove 44 about its periphery. Formed integrally at opposite sides of the sheave 43, are a pair of relatively large diameter bearing journals 45. These bearing journals 45 are polished and are supported in flanged bronze bearings 46 that are secured in retaining rings 47 on both sides of the sheave 43. The rings 47 are secured to the respective frame sections 41 and 42 by a plurality of bolts 50. With this mounting, the sheave 43 can rotate freely under no load conditions. The retaining rings 47 have the necessary tolerance with the sheave 43 to prevent lateral shifting yet permit free rotation.

A pair of cables 51, constituting flexible members, are connected at one end by yoke 52 to saddle plate 17 and connected at the other end by yoke 53 to the top of elongate weight 34. The cables 51 interconnecting the saddle plate 17 and counterbalance means 33 pass over and engage the sheave 43, the cables 51 seating in the cooperating grooves 44. A tie plate 54 interconnects the top portions of frame sections 41 and 42, the tie place 54 overlying the sheave periphery and the cables 51, and preventing displacement of cables 51 from the cooperating grooves 44.

The effective diameter of sheave 43 is the pitch diameter and is determined by the center line of cables 51 when seated in the sheave grooves 44. Because hoisting wheels of other types can be utilized, it will be understood that the effective diameter of the hoisting wheel is usually determined by the center line of the cooperating flexible member.

In the preferred embodiment, one of the cables 51 is under tension and supports the load, while the other cable 51 is tight but free of load-supporting tension, yet capable of supporting such load if the load is shifted to it as upon failure of the first cable.

The power means for driving the sheave 43 is supported by the sheave 43. This power means includes an electric motor 55 carried by a platform 56. Supported on the platform 56 is a speed reducer 57 interconnected to the motor 55 by a chain and sprocket drive connection 60. The drive shaft 61 of the speed reducer 57 is pushed into the keyed to the sheave hub 62. No coupling is employed. This drive cannot be misaligned. The speed reducer 57 includes a top flange 63 that is received in a recessed cap 64 formed as a part of frame section 42. The cap 64 includes a down-turned apron 64 adapted to engage the flange 63 and prevent relative rotation of the speed reducer 57. Moreover, the cap apron 65 precludes unintentional withdrawal of the drive shaft 61 from the sheave hub 62.

A wire pack 66 is selectively mounted on one end of boom 22, the wire pack 66 being loaded with electrode wire fed through a guide tube 70 to the welding head 30 located at the opposite end of boom 22. The wire pack 66 when fully loaded could weigh say 1,000 lbs. and could be used up completely in the process of welding. The operator 32 could use the manipulator without occupying the operator's seat 31. Therefore, the wire pack 66 and the operator 32 constitute a variable weight means. This assembly with a variable weight means cannot be safely supported by the counterbalance means alone. The assembly can be safely supported by making the bearing a journals 45 of the hoisting wheel 43 at least of a diameter that would afford a predetermined rotational frictional resistance with the bearings 46 under loading of the positioning means, variable weight means and counterbalance means so that the flexible members have a continuous resistance to at least compensate for any weight imbalance between the positioning means and the counterbalance means, including any weight imbalance caused by the variable weight means. The bearing journals 45 have at least a diameter to compensate for the largest weight imbalance between the positioning means and the counterbalance means caused by the variable weight means.

Preferably, the weight of the counterbalance means is between the weight of the positioning means and the weight of the positioning means plus the maximum weight of the variable weight means. Ideally, the weight of the counterbalance means is substantially the weight of the positioning means plus substantially one-half the weight range of the variable weight means, and the bearing journals have at least a diameter to compensate for substantially one-half the weight range of the variable weight means.

For the purpose of explanation, it will be assumed that the weight of the positioning means including saddle plate 17 and boom unit 21 weighs 5,000 lbs. The weight of the wire pack 66 when fully loaded is 1,000 lbs. The weight of the operator 32 is 200 lbs. It will be understood that the positioning means and variable weight means could range from 5,000 lbs. to 6,200 lbs. The counterbalance means 33 is adjusted by adding individual weights 37 into compartment 35 through the column opening 36 until the total weight is 5,600 lbs. This total weight of the counterbalance means 33 incorporates 5,000 lbs. that is the weight of the positioning means plus 600 pounds that represent one-half of the weight range of the variable weight means.

When the boom assembly is without electrode wire and operator, the weight of the positioning means is 5,000 lbs. Because the counterbalance means 33 is 5,600 lbs., one would have to introduce 600 pounds of additional resistance in the cables 51 to keep the boom unit 21 from changing its elevation. Similarly, when the boom unit 21 is fully loaded with wire pack 66 and operator 32, constituting the variable means, the boom assembly weighs 6,200 lbs. The weight difference as compared with the counterbalance means 33 is again 600 pounds. Therefore, with a variation of weight of 1200 lbs., only 600 pounds of additional resistance in the cables 51 is required to keep the system stationary.

All of the above assumptions have been made with the sheave 43 perfectly free to move in the bearings 46 under no load. There is no drive connection of any kind to prevent rotation, such as a self-locking worm gear reducer. If the system can be made perfectly safe without a brake or drive connection of any kind, such mechanisms will not have to be depended on to render the hoist perfectly safe.

The additional resistance of 600 lbs. is furnished by the large bearing journals 45 on both sides of sheave 43. The ratio of the diameter of bearing journals 45 to the effective diameter of the sheave 43 is at least as large as the greater diameter expresed by the equations:

$$\frac{D_1}{D_2} = \frac{(W_1 - W_2)}{(uW_1 + uW_2)}$$

and $$\frac{D_1}{D_2} = \frac{W_2 - (W_1 - W_3)}{uW_2 + u(W_1 - W_3)}$$

wherein:

$D_1$ is the diameter of the bearing journals 45,
$D_2$ is the effective diameter of sheave 43,
$W_1$ is the maximum weight of the positioning means and variable weight means,
$W_2$ is the weight of the counterbalance means 33,
$W_3$ is the maximum variable weight means, and
$u$ is the coefficient of friction under full lubrication.

If the effective diameter of sheave 43 is 17 inches, the bearing journal diameter on both sides of sheave 43 must be at least that expressed by the larger result of the equations:

$$D_1 = \frac{(W_1 - W_2)}{(uW_1 + uW_2)} D_2$$

and $$D_1 = \frac{W_2 - (W_1 - W_3)}{uW_2 + u(W_1 - W_3)} D_2$$

If the diameter of the bearing journals 45 were made 14 inches, this diameter would result in a continuous resistance in cables 51 against rotation of 880 lbs. Only 600 lbs. is necessary to render this system safe.

The effective resistance necessary to provide absolute safety for the operator 32 who has to ride the boom 22 of the manipulator is based on the bearing journals 45 and cooperating bearings 46 operating with maximum lubrication. If for some reason the lubrication of the bearing is neglected, such would only make the manipulator a safer mechanism to operate. Under such conditions, it is possible that lack of lubrication could stall the drive motor 55, which would then be a warning to the operator 32 that the hoist needs attention.

The drive motor 55 would have to be strong enough to overcome the resistance due to static friction. The coefficient of friction referred to is 0.10, that being the dynamic coefficient. Actual tests would provide an accurate value.

The individual weights 37 in the compartment 35 at the bottom of the elongate weight 34 can be used to make corrections for balancing, and is a practical answer to establishing the actual frictional resistance which is latent in the system. For instance, one could remove all the small weights 37 until the counterbalance means 33 becomes so light that the boom assembly would begin to move down. The weight of the counterbalance means 33 would then be recorded. Then, the weights 37 would be loaded into the compartment 35 until the counterbalance means 33 became so heavy that the boom assembly would start to move up. If the total weights 37 added amounted to say 1,000 lbs., then adding or subtracting 500 lbs. would produce a counterbalance means 33 that would be midway between the extremes, which would be ideal. This method would certainly provide a way of finding the amount of frictional resistance in the system.

The hoist assembly described in the above example, handling a total load from 10,600 to 11,800 lbs., could very safely be handled by one three-quarter inch diameter 6 x 37 hoisting cable 51, which has a breaking strength of 25 tons, thereby establishing a safety factor of five. If two such cables 51 were utilized, the safety factor would be raised to ten. If the load was actually carried by one cable 51, and if such cable should break, the load would shift over to the other cable 51 without developing an impact load.

A cable is composed of many strands of steel. For instance, the 6 x 37 cable has six strands, each with 37 wires. therefore, the cable is composed of 222 wires. All of the wires would have to break before the cable would fail. The cable is out in the open where wear can be inspected. A cable gives a long warning by displaying broken individual wires, by fraying. When such a warning signal is noticed, the cable can be replaced at low cost.

The cables 51 are attached by pins to yoke 52 on the saddle plate 17 and yoke 53 on the counterbalance means 33. Such pins are made so large in diameter that they provide many times the safety factor of the ultimate strength of the cables 51.

Cables 51, contacting the sheave 43 in the sheave grooves 44, constitute a friction drive. If the boom 22 should meet an immovable object during hoisting, the cables 51 would slip. Of course, the boom 22 would be protected against overtravel by means of limit switches (now shown). In the above examples, the frictional resistance due to the sliding or rolling action of the saddle plate 17 has not been considered. This would of course provide additional resistance and would make the unit operate with a still greater margin of safety. There are many other considerations that have not been brought out that would increase the safety factor.

Resistance generated by friction to take care of inadequacies in counterbalancing could be provided by other methods, such as a brake connected to the shaft upon which the sheave is mounted. Or, such resistance could be provided by friction shoes that would be spring-loaded and would engage the track on the column. However, these methods are not safe in that the spring supplying the pressure could fail. These devices are also subject to tampering. They are hard to adjust, and they add considerably to the cost.

I claim as my invention:

1. A safety hoist for a manipulator that includes a substantially vertical column, positioning means reciprocatively mounted on the column, and variable weight means selectively carried by the positioning means, the improvement comprising:
   (a) a rotary hoisting wheel mounted on the column above the positioning means,
   (b) a counterbalance means below the hoisting wheel,
   (c) an elongate, flexible member interconnecting the positioning means and the counterbalance means, the flexible member passing over and operatively engaging the hoisting wheel, and flexible member defining an effective diameter of the hoisting wheel,
   (d) the hoisting wheel including integral bearing journals,
   (e) bearings means supporting the bearing journals,
   (f) the bearing journals of the hoisting wheel having a diameter affording a rotational frictional resistance with the bearing means providing a resistance moment under loading of the positioning means, counterbalance means and any variable weight means so that the hoisting wheel has a continuous resistance to rotation to at least compensate for turning moment caused by any weight imbalance between the positioning means and the counterbalance means, including any weight imbalance caused by the variable weight means, said weight imbalance acting through the flexiable member,
   (g) power means selectively turning the hoisting wheel to raise or lower the positioning means,
   (h) said counterbalancing means having a weight less than the combined weight of the positioning means plus the maximum variable weight means, said combined weight constituting an upper limit, yet as least as large as the weight of the positioning means alone, said weight of the positioning means alone constituting a lower limit, and
   (i) said bearing journals having at least a diameter to compensate for the maximum amount of weight imbalance between the weight of the counterbalance and each of said upper and lower weight limits.

2. A safety hoist for a manipulator as defined in claim 1, in which:
   (j) the weight of the counterbalance is substantially the weight of the positioning means plus substantially one-half the weight range of the variable weight means, and
   (k) the bearing journals of the hoisting wheel have at least a diameter to compensate for substantially one-half the weight range of the variable weight means.

3. A safety hoist for a manipulator as defined in claim 1, in which:
   (j) the bearing journals of the hoisting wheel have at least a diameter as large as that expressed by the larger result derived from the equations:

$$D_1 = \frac{(W_1 - W_2)}{(uW_1 + uW_2)} D_2$$

and $$D_1 = \frac{W_2 - (W_1 - W_3)}{uW_2 - u(W_1 - W_3)} D_2$$

wherein:

$D_1$ is the diameter of the bearing jounals,
$D_2$ is the effective diameter of the hoisting wheel,
$W_1$ is the maximum weight of the position means and variable weight means,
$W_2$ is the weight of the counterbalance means,
$W_3$ is the maximum weight of the variable weight means, and
$u$ is the coefficient of friction.

4. A safety hoist for a manipulator as defined in claim 1, in which:
   (j) two flexible memers interconnect the positioning means and the counterbalance means, one flexible member being under tension and supporting the load, and the other flexible member being tight but free of load-supporting tension, yet capable of supporting such load.

5. A safety hoist for a manipulator as defined in claim 1, in which:
  (j) the power means includes a motor and speed reducer unit having a shaft connected to the hoisting wheel for rotation, the motor and speed reducer unit being supported completely by the shaft, and
  (k) means spaced from the center of rotation of said shaft precludes rotation of the motor and speed reducer unit relative to the column.

6. The method of counterbalancing a positioning means reciprocatively mounted on a column of a manipulator, in which a variable weight means is selectively carried by the positioning means, the method comprising the steps of:
  (a) connecting a flexible member to the positioning means,
  (b) passing the flexible member up and over, and in operative engagement with a hoisting wheel,
  (c) selecting a counterbalance weight between the combined weight of the positioning means plus the maximum weight of the variable weight means and the weight of the positioning means alone,
  (d) connecting the counterbalance means to the flexible member, and
  (e) making the bearing journals of the hoisting wheel of a diameter to provide a rotational frictional resistance with coacting bearing means so that the hoisting wheel has a continuous resistance to rotation to at least compensate for turning moment caused by any weight imbalance between the positioning means and the counterbalance means, including any weight imbalance caused by the variable weight means, said weight imbalance acting through the flexible member and said bearing journals being made at least of a diameter to compensate for the maximum amount of weight imbalance between the weight of the counterbalance means and the positioning means or between the weight of the counterbalance means and the weight of the positioning means plus the maximum weight of the variable weight means.

7. The method of counterbalancing as defined in claim 6, including the further steps of:
  (f) making the weight of the counterbalance means substantially the same weight as the positioning means plus substantially one-half the weight range of the variable weight means, and
  (g) the bearing journals of the hoisting wheel are made at least of a diameter to compensate for substantially one-half the weight range of the variable weight means.

8. The method of counterbalancing as defined in claim 6, including the further steps of:
  (f) interconnecting two flexible members between the positioning means and the counterbalance means,
  (g) placing one flexible member under tension to support the entire load, and
  (h) making the other flexible member tight, but free of load-supporting tension, yet capable of supporting such load if the load is not supported by the said first flexible member.

References Cited

UNITED STATES PATENTS

| | | | |
|---|---|---|---|
| 3,127,957 | 4/1964 | Nelson | 187—19 |
| 3,306,553 | 2/1967 | Mansell | 254—186 |
| 3,329,406 | 7/1967 | Flair | 254—186 |
| 3,347,525 | 10/1967 | Gregory | 254—192 |

FOREIGN PATENTS 50,278  9/1966  Germany.

EVON C. BLUNK, Primary Examiner

HARVEY C. HORNSBY, Assistant Examiner

U.S. Cl. X.R.

187—71, 94; 254—150, 192